(12) United States Patent
Kim

(10) Patent No.: US 12,307,934 B2
(45) Date of Patent: May 20, 2025

(54) ELECTRONIC DEVICE WITH EXTENDABLE DISPLAY SCREEN FOR DISPLAYING CONTENTS, AND CONTROL METHOD THEREFOR

(71) Applicant: LG ELECTRONICS INC., Seoul (KR)

(72) Inventor: Chang Mok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/794,362

(22) PCT Filed: Jan. 21, 2020

(86) PCT No.: PCT/KR2020/000995
§ 371 (c)(1),
(2) Date: Jul. 21, 2022

(87) PCT Pub. No.: WO2021/149844
PCT Pub. Date: Jul. 29, 2021

(65) Prior Publication Data
US 2023/0051261 A1    Feb. 16, 2023

(51) Int. Cl.
*G09G 3/00*     (2006.01)
*G06F 3/0484*   (2022.01)
*G06F 3/0488*   (2022.01)
*G06F 3/14*     (2006.01)

(52) U.S. Cl.
CPC ........... *G09G 3/035* (2020.08); *G06F 3/0484* (2013.01); *G06F 3/0488* (2013.01); *G06F 3/14* (2013.01); *G06F 2203/04803* (2013.01)

(58) Field of Classification Search
CPC .. G06F 3/04883; G06F 3/0484; G06F 1/1671; G06F 3/0485; G06F 3/0481; G06F 3/0482; G06F 3/0488; G06F 1/1624; G06F 1/16; G06F 1/1652; G06F 3/14; G06F 2203/04803; G06F 2203/04808; G09G 3/035; G09G 5/38; G09G 2354/00; G09G 2340/04
See application file for complete search history.

(56) References Cited

U.S. PATENT DOCUMENTS

| 2013/0290887 A1 | 10/2013 | Sun et al. |
| 2014/0137013 A1 | 5/2014 | Matas |
| 2015/0331574 A1 | 11/2015 | Kim et al. |

(Continued)

FOREIGN PATENT DOCUMENTS

| KR | 10-2012-0125086 A | 11/2012 |
| KR | 10-2014-0029096 A | 3/2014 |

(Continued)

*Primary Examiner* — Yaron Cohen
(74) *Attorney, Agent, or Firm* — Birch, Stewart, Kolasch & Birch, LLP

(57) ABSTRACT

According to an example embodiment of the present disclosure, an electronic device includes a display that is flexible, has at least a portion located at a first side of the electronic device, and is changeable in size to which the display is exposed to the first side, and a controller configured to display first content in at least a portion of the first side. In response to a first input, the controller displays a first portion of the first content in a first area of the first side and displays a second area distinguished from the first area.

18 Claims, 17 Drawing Sheets

(56) References Cited

U.S. PATENT DOCUMENTS

2017/0364119 A1 12/2017 Lee et al.
2018/0275770 A1* 9/2018 Kang ....................... G09G 3/20

FOREIGN PATENT DOCUMENTS

| KR | 10-2017-0141438 A | 12/2017 |
| KR | 10-1858156 B1 | 5/2018 |
| KR | 10-2019-0004618 A | 1/2019 |

* cited by examiner

ELECTRONIC DEVICE WITH EXTENDABLE DISPLAY SCREEN FOR DISPLAYING CONTENTS, AND CONTROL METHOD THEREFOR

CROSS REFERENCE TO RELATED APPLICATIONS

This application is the National Phase of PCT/KR2020/000995 filed on Jan. 21, 2020, which is hereby expressly incorporated by reference into the present application.

TECHNICAL FIELD

This disclosure relates to an electronic device for displaying at least a portion of content in a predetermined area and a control method thereof, and one particular implementation relates to an electronic device that displays at least a portion of content in a first area of the electronic device according to an input and a control method thereof.

BACKGROUND ART

Advances in network technologies and expansions of infrastructures have enabled electronic devices to perform various tasks. With such technological advances, it is required to perform various tasks simultaneously using a plurality of applications in parallel in a certain situation.

However, a display providing a larger screen may increase in size proportionally to a size of a screen. Thus, it is necessary to consider a portability along with a size of the display in terms of an electronic device of which the portability is emphasized, such as a mobile terminal.

For this, a method for changing a size of a display as needed by applying a flexible display to the electronic device may be taken into consideration.

In a display changeable in size of exposure, a range to which a user can apply an input with one hand may be changed based on a size change of the display. For example, when the user uses the electronic device with one hand before the display is expanded, the user may freely apply the input without restrictions with respect to 70% of the entire area of the display.

However, in a case in which the display is expanded, the user may freely apply the input with respect to 50% of the entire area of the display.

In this case, in order for the displayed content to be freely used, the user may be required to change the position of the hand or to use both hands. That is, as the display expands, it may cause inconvenience in using the electronic device. In addition, when the position of the hand is changed to use the content, the electronic device may fall while changing the position of the hand, which may lead to damage.

Accordingly, there is a desire for a method to more conveniently and efficiently use content displayed on a display.

DISCLOSURE OF INVENTION

Technical Goals

An aspect provides an electronic device that changes an area for displaying content based on an input to use the content with increased convenience and efficiency and a control method thereof.

Technical goals of the present disclosure are not limited as mentioned above and, although not mentioned, may include goals that can be clearly understood by those skilled in the art to which the present disclosure pertains, from the following description.

Technical Solutions

According to an aspect, there is provided an electronic device including a display that is flexible, has at least a portion located at a first side of the electronic device, and is changeable in size to which the display is exposed to the first side and a controller configured to display first content in at least a portion of the first side, wherein, in response to a first input, the controller is configured to display a first portion of the first content in a first area of the first side and display a second area distinguished from the first area.

According to another aspect, there is also provided a control method of an electronic device including a display that is flexible, has at least a portion located at a first side of the electronic device, and is changeable in size to which the display is exposed to the first side, the control method including displaying first content in at least a portion of the first side and displaying, in response to a first input, a first portion of the first content in a first area of the first side and displaying a second area distinguished from the first area.

Effects

According to example embodiments, it is possible to provide an electronic device that changes an area for displaying content based on an input to use the content with increased convenience and efficiency and a control method thereof.

Further, according to example embodiments, it is possible to display content in an area determined based on a position to which an input is applied so that the content is more easily used.

Effects are not limited to the aforementioned effects, and other effects not mentioned will be clearly understood by those skilled in the art from the description of the claims.

BEST MODE FOR CARRYING OUT THE INVENTION

Figure 1:
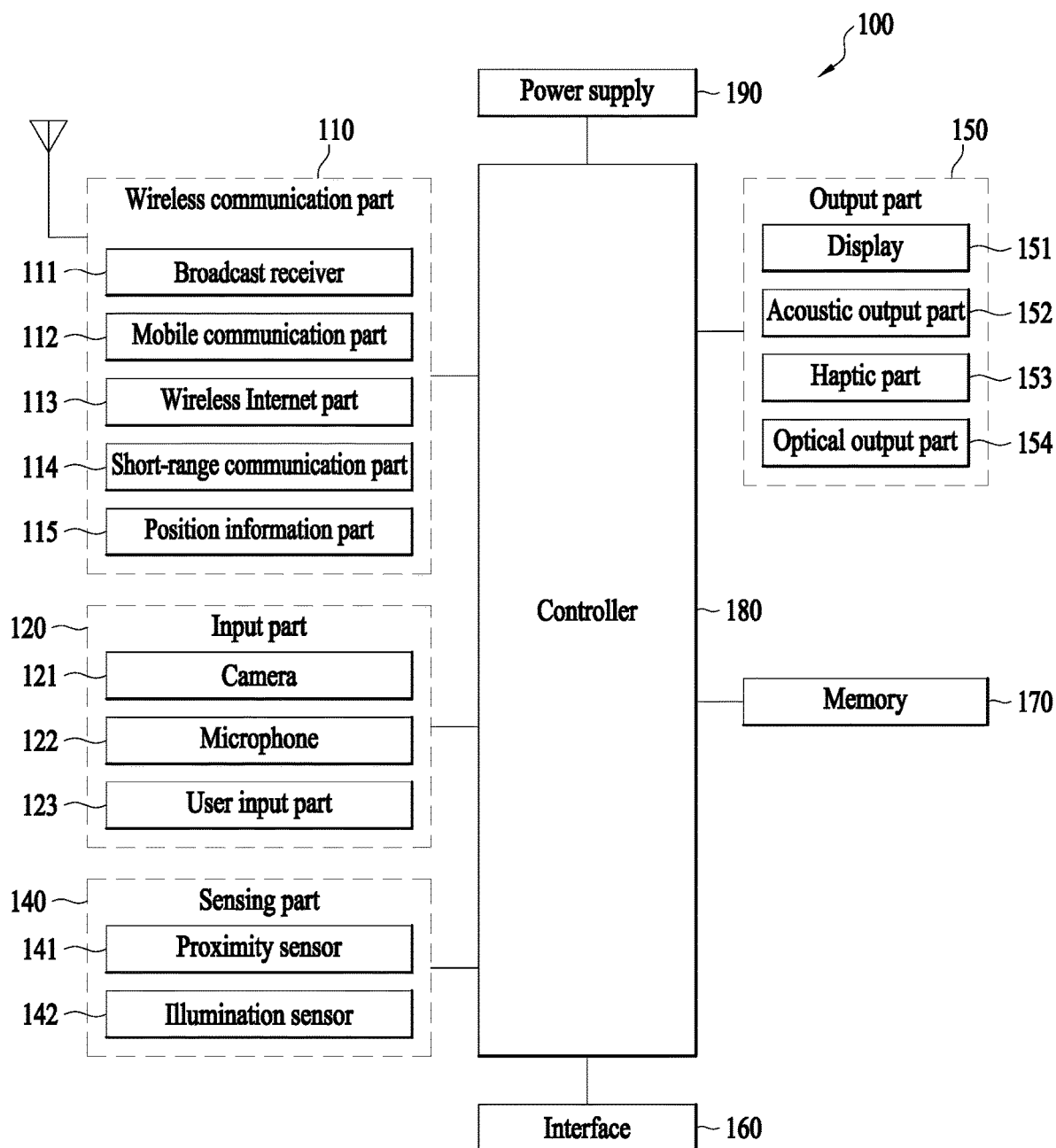
FIG. 1 is a block diagram illustrating an electronic device related to the present disclosure.

Hereinafter, example embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known arts will be omitted when it is deemed that such description will cause ambiguous interpretation of the present disclosure. In addition, the accompanying drawings are only for easy understanding of the embodiments disclosed in the present specification, and the technical ideas disclosed in the present specification are not limited by the accompanying drawings. Also, it should be understood to cover all modifications, equivalents, and alternatives falling within the spirit and scope of the present specification.

Although terms such as "first" and "second" may be used herein to describe various elements, these elements are not to be limited by these terms. Rather, these terms are only used to distinguish one element from another element.

When an element is described as being "connected to" or "coupled to" another element, it may be directly "connected to" or "coupled to" the other element, or there may be other elements intervening therebetween. In contrast, when an element is described as being "directly connected" or "directly coupled to" another element, there can be no other elements intervening therebetween.

The singular forms are intended to include the plural forms as well, unless the context clearly indicates otherwise.

In the present specification, it will be further understood that the terms "comprises" or "includes", when used herein, specify the presence of stated features, integers, steps, operations, elements, components, or combinations thereof, but do not preclude the presence or addition of one or more other features, integers, steps, operations, elements, components, or combinations thereof.

FIG. 1 is a block diagram illustrating an electronic device (or a mobile terminal) 100 related to an example embodiment of the present disclosure.

An electronic device 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic device, so the electronic device 100 described herein may have more or fewer components than those listed above.

Specifically, the wireless communication part 110 may include at least one module that enables wireless communication to be performed between the electronic device 100 and a wireless communication system, between the electronic device 100 and another electronic device 100, or between the electronic device 100 and an external server. The wireless communication part 110 may include one or more modules that connect the electronic device 100 to one or more networks.

The wireless communication part 110 may include at least one of a broadcast receiver 111, a mobile communication part 112, a wireless Internet part 113, a short-range communication part 114, and a position information part 115.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The sensing part 140 may include one or more sensors to sense at least one of information in the electronic device 100, surrounding environment information of the electronic device 100, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the electronic device 100 may use a combination of pieces of information sensed in at least two sensors among the aforementioned sensors.

The output part 150 may be to generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may function as the user input part 123 that provides an input interface between the electronic device 100 and a user, and simultaneously, may provide an output interface between the electronic device 100 and the user.

The interface 160 may function as a passage to various types of external devices connected to the electronic device 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic device 100 may perform an appropriate control associated with the connected external device.

The memory 170 may store data supporting various functions of the electronic device 100. The memory 170 may store application programs (or applications) run in the electronic device 100, data for operation of the electronic device 100, and instructions. At least a portion of the application programs may be downloaded from an external server through wireless communication. Also, at least a portion of the application programs may exist in the electronic device 100 for a basic function (for example, call forwarding and outgoing function and message receiving and outgoing function) of the electronic device 100 from the time of manufacture. The application program may be stored in the memory 170, installed in the electronic device 100, and run by the controller 180 to perform an operation (or function) of the mobile terminal.

The controller 180 may generally control an overall operation of the electronic device 100 in addition to operations related to the application programs. The controller 180 may process a signal, data, information, and the like input or output through the aforementioned components or run the application program stored in the memory 170, thereby providing information to a user or performing appropriate information or function.

In addition, to run the application program stored in the memory 170, the controller 180 may control at least a portion of the components shown in FIG. 1. Furthermore, to run the application program, the controller 180 may operate a combination of two or more components among the components included in the electronic device 100.

The power supply 190 may supply power to each component included in the electronic device 100 by receiving external or internal power under a control of the controller 180. The power supply 190 may include a battery. The battery may include a built-in battery or a removable battery.

At least a portion of the aforementioned components may operate in cooperation with each other to implement an operation, a control, or a control method of the mobile terminal according to various embodiments as described below. In addition, the operation, control, or control method of the mobile terminal may be implemented on the mobile terminal through an execution of at least one application program stored in the memory 170.

In the present disclosure, the electronic device 100 may refer to a mobile terminal obtained by applying a flexible display to the above-described electronic device 100. The flexible display may refer to a flexible display to be bent such that a winding area is changed.

The flexible display may refer to a lightweight and durable display manufactured on a thin and flexible substrate so as to be curved, bendable, folded, twisted, or rolled like a paper while having a characteristic of a typical flat panel display.

The flexible display may implement a flexible touch screen in combination with a touch sensor. In response to a touch being input through the flexible touch screen, the controller 180 may perform a control corresponding to the touch input.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The electronic device 100 may include a deformation detection part that detects a deformation of the flexible display. The deformation detection part may be included in the sensing part.

Information related to the deformation may include, for example, a direction in which the flexible display is deformed, a degree of deformation, a deformed position, a deformation time, and an acceleration at which the deformed flexible display is restored. In addition, the information related to the deformation may be various information to be detected in response to the flexible display being bent.

Also, based on the information related to the deformation of the flexible display detected by the deformation detection part, the controller 180 may change information displayed on the flexible display or generate a control signal for controlling functions of the electronic device 100.

A state change of the flexible display, for example, an expansion or reduction of a front surface area may occur due to an external force but not be limited thereto. For example, the front surface area of the flexible display may be expanded or reduced by the user or based on a command of an application. A driver may be included to change the state of the flexible display without applying the external force.

When the flexible display covers from the front surface to a rear surface, a space implemented in a typical rear case to mount an antenna may be restricted. Thus, the antenna may be embodied on the flexible display. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed as the flexible display 151 unless otherwise stated.

Figure 2:
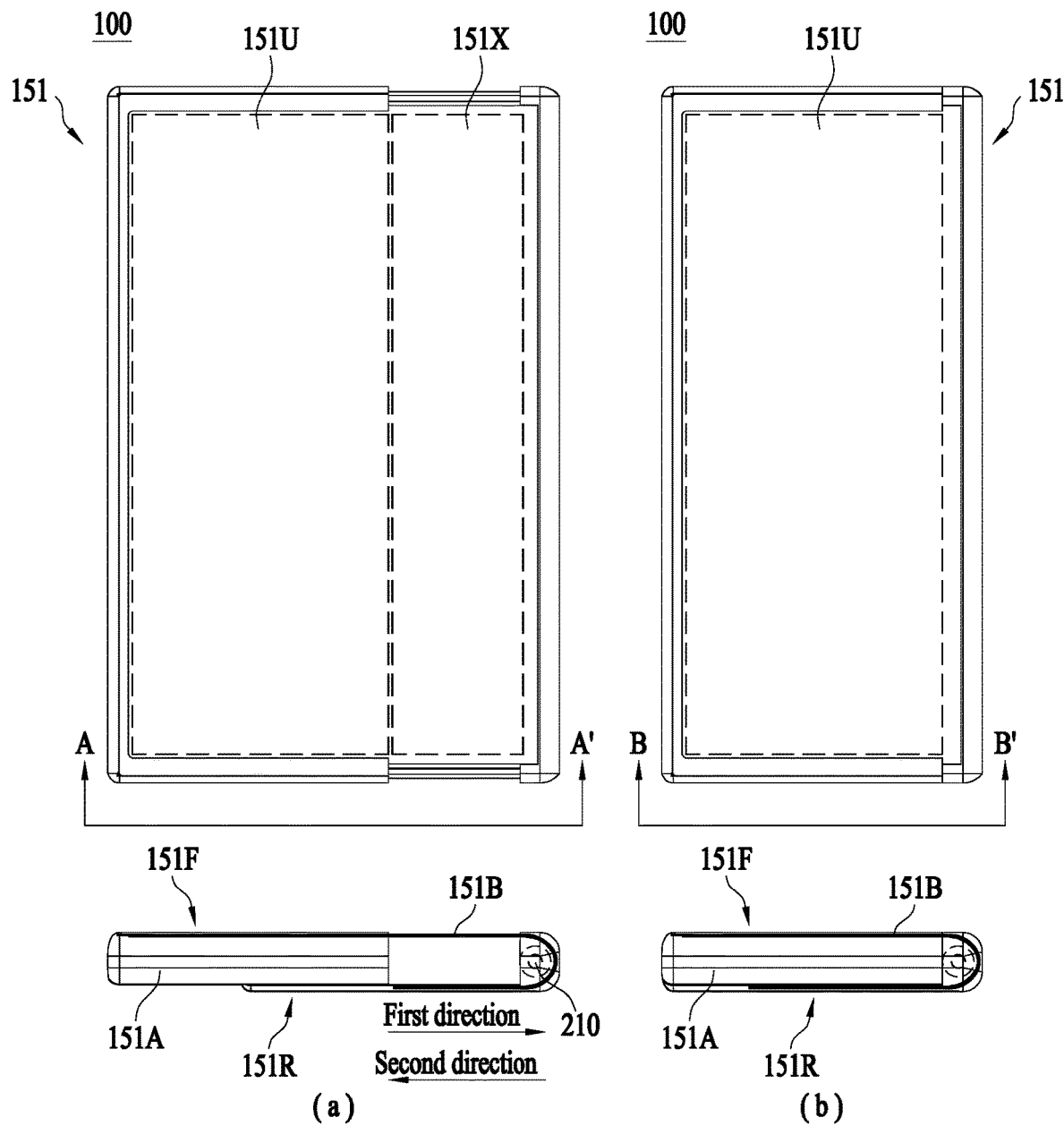
FIGS. 2 and 3 illustrate views obtained before and after an expansion of a display of an electronic device related to the present disclosure.
Figure 3:
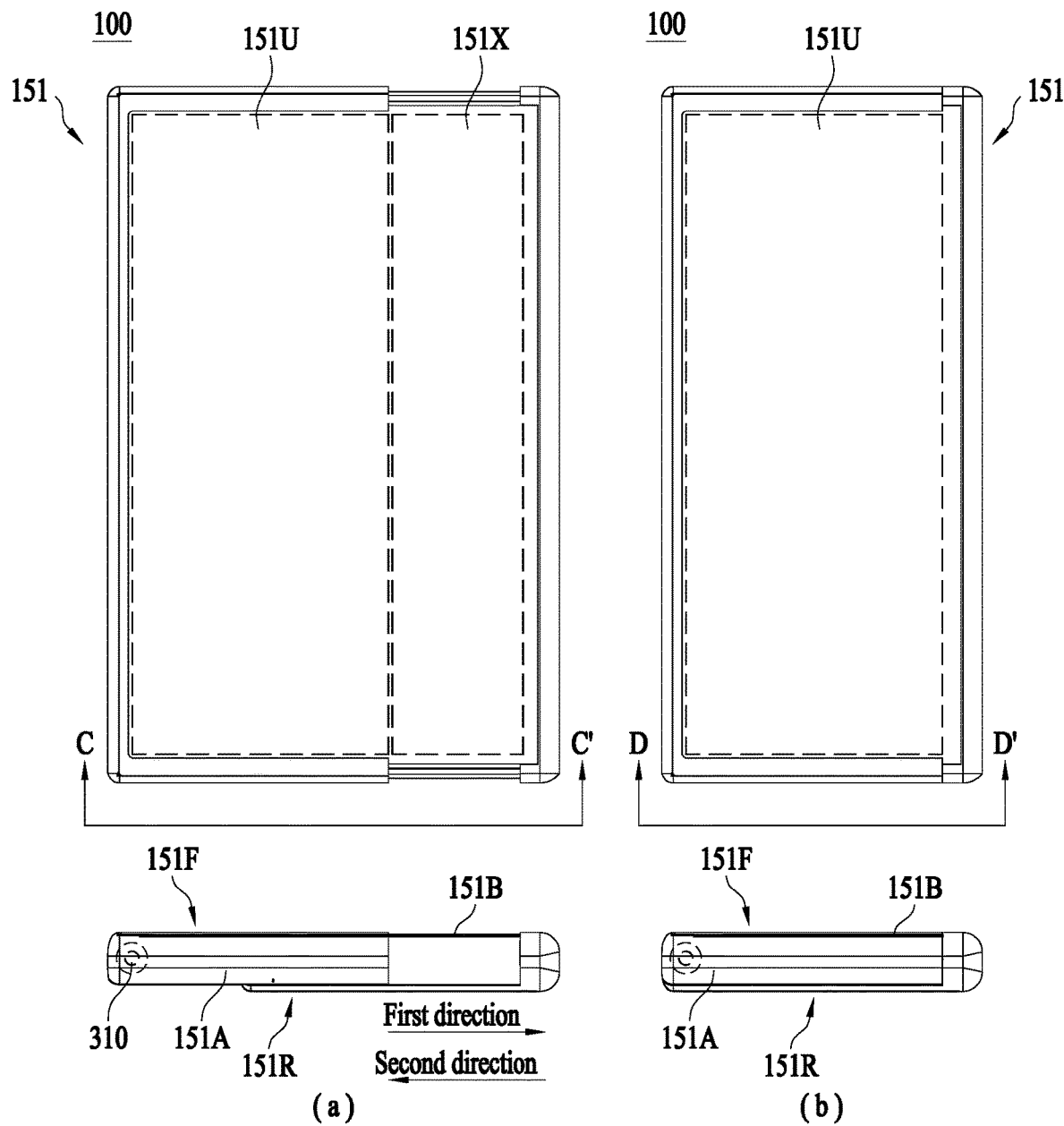

FIGS. 2 and 3 are conceptual diagrams illustrating states before and after a display 151 of the electronic device 100 is expanded according to an example embodiment of the present disclosure.

Specifically, FIG. 2 illustrates the case where an edge on which a display 151 is rolled up and out in relation to extension is a first direction edge 210, and FIG. 3 illustrates the case where an edge on which the display 151 is rolled up and out in relation to extension is a second direction edge 310 that opposes the first direction edge 210.

Specifically, (a) of FIG. 2 illustrates the electronic device 100 with the display 151 which is extended, and (b) of FIG. 2 illustrates the electronic device 100 with the display 151 which is not extended.

Referring to FIG. 2, the display 151 may have one side fixed at a front surface based on the electronic device 100 and may be rolled up on a first direction edge 210 to be provided on a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, if the front region 151F of the display 151 increases in area, the first direction edge 210 of the display 151 may move in the first direction, and, if the front region 151F of the display 151 decreases in area, the first direction edge 210 of the display 151 may move in the second direction.

In order to guide and support the display 151 to be extended or retracted, a frame supporting the display 151 may be extended or retracted as well. The frame may include a first frame 151A and a second frame 151B, which slidably moves in the first direction relative to the first frame 151A.

A part of the front region 151F to be maintained regardless of extension and retraction of the display 151 may be defined as a fixed part 151U. A part of the front region 151F to be selectively exposed according to extension and retraction of the display 151 may be defined as a variable part 151X. In a state in which the front region 151F of the display 151 is extended, the fixed part 151U of the display 151 may be positioned at the first frame 151A and the variable part 151X of the display 151 may be positioned at the second frame 151B.

When the second frame 151B slidably moves in the first direction to be extended from the first frame 151A, the front region 151F of the display 151 may be extended, causing the fixed part 151U and the variable part 151X to be exposed to the front surface. When the second frame 151B slidably moves in a direction opposite to the first direction to be retracted toward the first frame 151A, the front region 151F of the display 151 may be reduced as well, causing only the fixed part 151U to remain exposed to the front surface.

The rear region of the display 151 may be exposed to a rear surface of the second frame 151B. The rear region of the display 151 may be covered by a light-transmitting rear window and therefore visible from the outside.

Meanwhile, the front region 151F of the display 151 may be exposed to a front surface without an additional window. In some cases, however, a deco frame may cover a boundary region between the front region 151F and the first frame 151A, thereby preventing an external material and covering a bezel region of the electronic device to help visibility of a screen for a user.

An electronic part may be formed in an inner surface formed by external structures such as the first frame 151A and the second frame 151B. An electronic component for driving the electronic device 100, such as a battery 191, may be mounted at a main printed circuit board (PCB) and thus provided in the electronic part. Alternatively, an electronic component such as an internal antenna module may be mounted directly at the electronic part rather than mounted at the main PCB.

In an example embodiment, the electronic device 100 may include a driving part for controlling a size of the display 151. The driving part may be implemented, for example, using a motor. The electronic device 100 may control a size of the display 151 by controlling a moving direction of the first direction edge 210 of the display 151 using a motor.

Specifically, (a) of FIG. 3 illustrates an electronic device 100 with a display 151 which is extended, and (b) of FIG. 3 illustrates the electronic device 100 with the display 151 which is not extended.

Referring to FIG. 3, the display 151 may have one side fixed at a front region based on the electronic device 100 and may be rolled up on a second direction edge 310 to be provided over a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, even when the front region 151F of the display 151 increases or decreases in area, the second direction edge 310 of the display 151 may remain at the same position. A redundant description of FIG. 3 with FIG. 2 will be omitted.

In FIGS. 2 and 3, the display is described as being extended in the first direction, but not limited thereto. For example, the display may be extended in the second direction. In the following description, the display may be extended in various directions (e.g., the first direction or the second direction).

Figure 4:
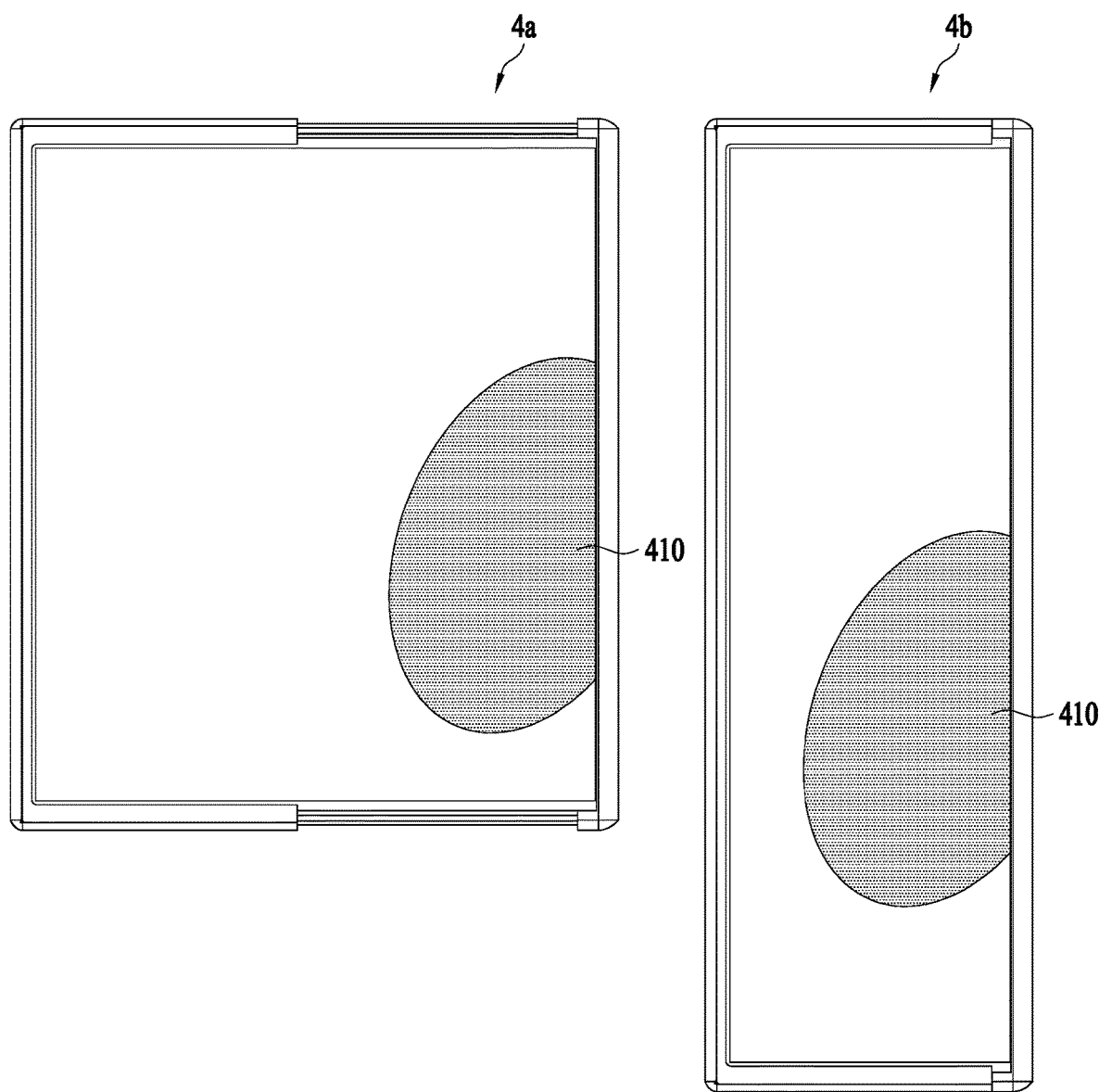
FIG. 4 is a conceptual diagram illustrating an input range of an electronic device according to an example embodiment of the present disclosure.

FIG. 4 is a conceptual diagram illustrating an input range of an electronic device according to an example embodiment of the present disclosure.

Reference numerals 4a and 4b illustrate examples of an input range set in a case in which a user uses an electronic device with holding the electronic device in his or her right hand. For example, when the user grabs the electronic device with the right hand and uses the electronic device, the user may apply a touch input to a display using a thumb. In this case, the input range may correspond to a moving range of the thumb.

The reference numeral 4a indicates an input range set in a case in which the display is implemented to expand horizontally. The reference numeral 4b indicates an input range set in a case in which the display is implemented to expand vertically. The following descriptions will be based on the case in which the display expands vertically, but it is merely an example.

According to the reference numerals 4a and 4b, the input range may be set irrespective of the size of the display. Thus, the electronic device according to an example embodiment of the present disclosure may adjust a content displaying area such that content to be used is located within the input range. A related example will be described in detail later.

Figure 5:
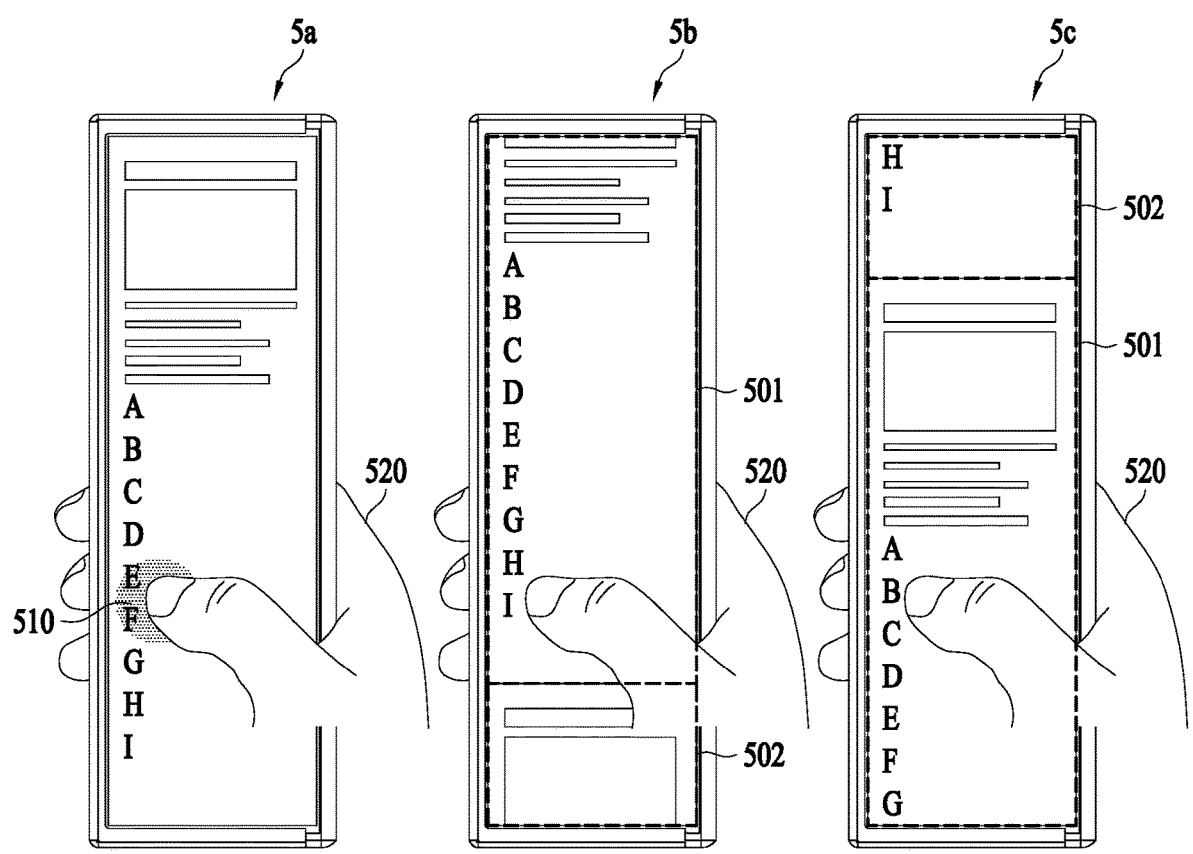
FIG. 5 is a diagram illustrating an example of displaying content according to an example embodiment of the present disclosure.

FIG. 5 is a diagram illustrating an example of displaying content according to an example embodiment of the present disclosure. Specifically, FIG. 5 illustrates an example of a case in which an area for displaying content is changed on a display in response to a user input.

Reference numeral 5a illustrates an example of displaying content on the electronic device. Specifically, as indicated by the reference numeral 5a, the electronic device may display the content in the entire area of the display. An input of a user 520 (hereinafter, referred to as a "first input") may be received at a predetermined point of the display. For example, a position at which an input is received may correspond to a first position 510.

Here, the first input may include a touch input as illustrated, but it is merely an example. A related example will be described in greater detail with reference to FIG. 15 or 16.

Meanwhile, it should be noted that alphabets (e.g., A, B, C, D, E, F, G, H, and I) in the drawings (e.g., FIGS. 5 and 8 through 15) including the reference numeral 5a are illustrative of the first content. However, it is merely an example, and at least one of the alphabets may be replaced with another content.

Reference numerals 5b and 5c illustrate examples of displaying a portion of content in a first area 501 in response to the first input. As indicated by the reference numerals 5b and 5c, a location of the first area 501 may vary depending on embodiments.

According to the reference numeral 5b, in response to the first input being applied, a first portion of content may be displayed in the first area 501. The first portion of the content may be a portion designated to correspond to the first input. For example, as illustrated, the first portion of the content may include an area located in a lower part and corresponding to a predetermined size in the content that has been displayed as indicated by the reference numeral 5a.

The first area 501 may be a predetermined area on the display and correspond to at least a portion of an upper part of the display. In this case, as illustrated, even if a hand of the user 520 is located at a same position after the first input is applied, the content may be moved upward and displayed. Thus, the user may easily use a lower portion of the content.

In some cases, a second portion, which is another portion of the content, may be displayed in a second area 502. When the first portion of the content displayed in the first area 501 corresponds to an area located in a lower part and corresponding to a first size in the content, the second portion of the content displayed in the second area 502 may include an area located in an upper part and corresponding to a second size in the content.

According to the reference numeral 5c, in response to the first input being applied, the first portion of the content may be displayed in the first area 501. The first portion of the content may be a portion designated to correspond to the first input. For example, as illustrated, the first portion of the content may include an area located in the upper part and corresponding to a predetermined size in the content that has been displayed as indicated by the reference numeral 5a.

The first area 501 may be a predetermined area on the display and correspond to at least a portion of the lower part of the display. In this case, as illustrated, even if the hand of the user 520 is located at the same position after the first input is applied, the content may be moved downward and displayed. Thus, the user may use an upper portion of the content with increased ease.

In some cases, the second portion, which is another portion of the content, may be displayed in the second area 502. When the first portion of the content displayed in the first area 501 corresponds to an area located in the upper part and corresponding to the first size in the content, the second portion of the content displayed in the second area 502 may include an area located in the lower part and corresponding to the second size in the content.

In the example embodiment, the first area 501 and the second area 502 may be distinguished from each other. For example, the first area 501 and the second area 502 may be implemented as windows independent of each other to display content portions corresponding to the first area 501 and the second area 502, so that the first area 501 and the second area 502 are distinguished from each other. Meanwhile, information that distinguishes between the first area 501 and the second area 502 may also be referred to as information indicating the second area. However, such terminology does not limit example embodiments of the present disclosure.

Figure 6:
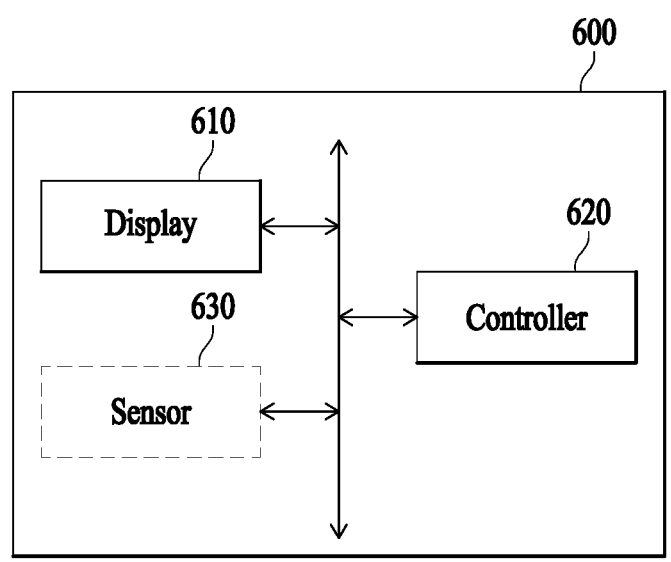
FIG. 6 is a functional block diagram illustrating an electronic device according to an example embodiment of the present disclosure.

FIG. 6 is a functional block diagram illustrating an electronic device according to an example embodiment of the present disclosure. In the following description, an element of an electronic device 600 may indicate a unit that processes at least one function or operation, and may be implemented as hardware or software, or a combination of hardware and software.

Referring to FIG. 6, the electronic device 600 may include a display 610 and a controller 620. In some cases, the electronic device 600 may further include a sensor 630.

The display 610 may be disposed to be changeable in size to which the display 610 is exposed to a first side (e.g., a front surface of the electronic device 600) of the electronic device 600. The display 610 may be implemented to be flexible.

Meanwhile, the following descriptions will be made based on a case in which an exposed size of the display 610 is changed vertically, but it is merely an example. As would be apparent to those skilled in the art, it is also applicable to a case in which the exposed size of the display 610 is changed horizontally.

The display 610 may display various information associated with an operation of the electronic device 600. For example, the display 610 may display content related to an application provided based on an execution of the application or content representing the application.

In the example embodiment, a portion of the display 610 may be located at the first side and another portion may be wound at one side of the electronic device 600 so as to be located at a second side of the electronic device 600. Here, the first side may include the front surface of the electronic device 600 and the second side may include a rear surface that faces the first side in the electronic device 600. Specifically, the display 610 may be bent at one end adjoining the first side such that at least a portion of the display 610 is located at the first side and at least another portion is located at the second side adjoining the one end.

The controller 620 may display first content in at least a portion of the display 610 of the first side. The first content may include, for example, content related to an application. In this case, the controller 620 may display the first content on the display 610 of the first side in response to the application being executed.

The controller 620 may display a first portion of the first content in a first area of the first side in response to the first input. Here, the first input may be an input applied by a user to the electronic device 600 and include, for example, a predetermined type of touch input.

The first portion may be at least a portion of the first content and include a predetermined portion related to the first input. As an example, when the first input is a touch input of sliding upward, the first portion may include at least a portion corresponding to an area having a predetermined size and placed below the first content. In addition, when the first input is a touch input of sliding downward, the first portion may include at least a portion corresponding to an area having a predetermined size and placed above the first content.

As another example, when the first input corresponds to a tab input, the first portion may include at least a portion corresponding to an area having a predetermined size and placed below the first content. In addition, when the first input is a double-tab input, the first portion may include at least a portion corresponding to an area having a predetermined size and placed above the first content.

In the example embodiment, a first area may be a partial area of the display 610 designated in relation to the first input. For example, the first area may include a predetermined area of an upper part of the display 610 located at the first side or a predetermined area of a lower part.

The controller 620 may display a second area. The second area may be distinguished from the first area and include an area of the display 610 located at the first side. For example, the controller 620 may display the second area in response to the first input. In other words, the controller 620 may display the second area in parallel with the first area and may display the second area irrespective of an order of displaying the first area.

In the example embodiment, the controller 620 may display information indicating the second area. Here, the information indicating the second area may be information on the second area distinguished from the first area and may include, for example, information for representing the first area and the second area as separate windows. In some cases, the information indicating the second area may include indirect information appearing in response to the first area and the second area being displayed to be distinguished from each other.

In the example embodiment, the controller 620 may display a second portion of the first content in the second area. The second portion may be at least a portion of the first content, and may include, for example, a portion placed to be connected to the first portion of the first content but not be limited thereto.

In the example embodiment, the controller 620 may display second content in the second area. As an example, the second content may include content related to an application different from the application related to the first content. As another example, the second content may include a predetermined application, and a related example is described in detail with reference to FIG. 13. As still another example, the second content may include predetermined content (e.g., an image), and a related example is described in detail with reference to FIG. 8.

The controller 620 may display the second portion of the first content and the second content of the second content based on a type of the first input and a position of the first input. In the example embodiment, the controller 620 may determine at least one of a size of the second area and a position of the second area based on a position corresponding to the first input. At least one of the size of the second area and the position of the second area may be designated in advance for each position to which the first input is applied.

As an example, when the first input is applied to a first position, the second area may be displayed at a first size in a predetermined range from a top of the display 610. Also, when the first input is applied to a second position, the second area may be previously designated to be displayed at a second size within a predetermined range from the top of the display 610. As another example, when the first input is applied to the first position, the second area may be displayed within a predetermined distance range from the top of the display 610. Also, when the first input is applied to the second position, the second area may be previously designated to be displayed at the second size within a predetermined distance range from a bottom of the display 610.

In such case, when the first input is received, the controller 620 may identify at least one of the size of the second area and the position of the second area corresponding to the position of the first input and determine at least one of the size of the second area and the position of the second area based on the at least one identified.

In the example embodiment, the controller 620 may identify a distance between the position corresponding to the first input and a predetermined position. The predetermined position may include a specific position on the display 610 placed at the first side. The controller 620 may determine at least one of the position of the first area and the size of the first area based on the identified distance.

As an example, the controller 620 may determine the size of the first area such that a vertical length of the first area corresponds to the identified distance. A related example is described in detail with reference to FIG. 9 or 10. As another example, the controller 620 may determine the position of the first area such that the first area is placed between the position corresponding to the first input and the predetermined position.

In the example embodiment, when the first input includes an input moving from the first position to the second position, the controller 620 may determine a size of at least one of the first area and the second area based on a distance between the first position and the second position. For example, the controller 620 may determine the vertical length of the second area to correspond to the distance between the first position and the second position and determine the first area to be an area distinguished from the second area on the display 610 of the first side. A related example is described in detail with reference to FIG. 11 or 12.

In the example embodiment, when the display 610 is expanded, the size of the second area may correspond to an expanded size of the display exposed to the first side. For example, when the display 610 is expanded from the first size to the second size, and when the first input is received, the size of the second area may be determined to be a size corresponding to a difference between the first size and the second size.

In the example embodiment, the first area may be smaller than an area in which the first content has been displayed on the display 610. In this case, an area displaying the first content may be reduced in size based on the first input. In response to such a change in size, a portion of the first content, that is, the first portion may be displayed in the first area. The first portion of the first content displayed in the first area may be determined based on various example embodiments described herein.

In the example embodiment, the controller 620 may determine the first portion of the first content displayed in the first area based on the position of the first input. The controller 620 may determine the first portion of the first content based on a first distance from the position corresponding to the first input to the bottom of the first side and a second distance from the position corresponding to the first input to the top of the first side.

Specifically, when the first input is an input applied to a predetermined position, the controller 620 may identify the first distance from the position corresponding to the first input to the bottom of the first side and the second distance from the position corresponding to the first input to the top of the first side. The controller 620 may determine a portion of the first content corresponding to a greater distance among the first distance and the second distance to be the first portion. In this case, the controller 620 may determine the size of the first area to correspond to the first portion or to be the size of the first portion or more.

In some cases, the controller 620 may determine a portion of the first content corresponding to a smaller distance among the first distance and the second distance to be the second portion. In such cases, the controller 620 may determine the size of the second area to correspond to the second portion or to be the size of the second portion or more. A related example is described in detail with reference to FIG. 9 or 10.

In the example embodiment, the first input may include an input related to a first direction or a second direction. When the first input is related to the first direction, the controller 620 may determine an area corresponding to a predetermined length range from the bottom of the first side to be the first area. Accordingly, content related to the first area, that is, the first portion of the first content may be displayed on the area corresponding to the predetermined length range from the bottom of the first side. A related example is described in detail with reference to FIG. 11.

When the first input is related to the second direction, the controller 620 may determine an area corresponding to a predetermined length range from the top of the first side to be the first area. Accordingly, content related to the first area, that is, the first portion of the first content may be displayed on the area corresponding to the predetermined length range from the top of the first side. A related example is described in detail with reference to FIG. 12.

In the example embodiment, the controller 620 may control the first content and the second content independently based on a position of the input applied to the display 610. Specifically, the controller 620 may independently move content displayed in each of the first area and the second area based on a second input received on one of the first area and the second area. The movement of the content displayed in each of the first area and the second area may correspond to scrolling.

For example, when a scroll input to the first area is received, the controller 620 may receive a scroll motion on the first portion of the content displayed in the first area. In this example, the second portion of the content displayed in the second area may also be scrolled. However, depending on an example embodiment, the scrolling on the second portion may be performed independently of the scrolling on the first portion.

In the example embodiment, when content representing a predetermined application is included in the second area, the controller 620 may display content related to the predetermined application in the first area in response to a third input. As an example, when the third input is received, the controller 620 may display the content related to the predetermined application in at least a portion of the first area. As another example, when the third input is received, the controller 620 may replace the first portion of the first content displayed in the first area with the content related to the predetermined application to display the content related to the predetermined application.

In the example embodiment, the controller 620 may display the second portion of the first content or the second content in the second area based on a type of the first input or a position of the first input. As an example, when a touch input having a predetermined area (or a threshold area) or more is applied as the first input, the controller 620 may display the second portion of the first content in the second area. When a touch input having an area less than the predetermined area is applied as the first input, the controller 620 may display the second content in the second area.

As another example, when the first input is applied to the first position, the controller 620 may display the second portion of the first content in the second area. When the first input is applied to the second position, the controller 620 may display the second content in the second area.

The first input may include at least one of, for example, a touch input on an area of a predetermined size, a touch input on at least one position, a double-tab input, an input on a sensor, and an input on a predetermined position. However, the first input is not limited to the aforementioned inputs, and a related example is described with reference to FIG. 16 or 17.

The sensor 630 may include a predetermined sensor that senses an input. For example, the sensor 630 may include a proximity sensor or a motion sensor. In this case, depending on an example embodiment, the first input may be implemented as an input on the sensor 630.

In some cases, the sensor 630 may be implemented in a form of a physical key.

When the electronic device 600 includes the sensor 630, the controller 620 may identify the first input based on information acquired from the sensor 630. In response to the identified first input, the controller 620 may perform at least one of the aforementioned operations, that is, an operation related to the first area or the second area.

Figure 7:
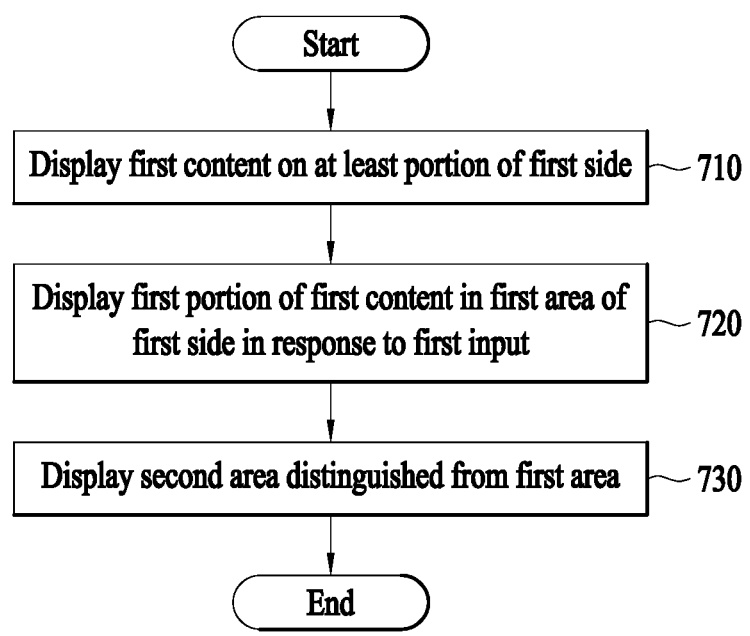
FIG. 7 is a flowchart illustrating operations of a method of controlling an electronic device according to an example embodiment of the present disclosure.

FIG. 7 is a flowchart illustrating operations of a method of controlling an electronic device according to an example embodiment of the present disclosure. As would be apparent to one skilled in the art, in some cases, operations of FIG. 7 may be performed in a different order from that shown in the drawing.

Referring to FIG. 7, in operation 710, the electronic device may display first content on at least a portion of a first side. The first content may include content related to an application.

In operation 720, the electronic device may display a first portion of the first content in a first area of the first side in response to a first input. Specifically, when the first input is received, the electronic device may display the first portion of the first content displayed on the display in the first area of the display. The first area may correspond to one area of the display placed at the first side of the electronic device.

In some cases, the first area may be an area distinguished from an area in which the first content has been displayed in relation to operation 710. For example, an area in which the first content is displayed in operation 710 may include the entire area of the display placed at the first side, and the first area may include a partial area of the display located in an upper part of the first side of a predetermined size. In this case, the area in which the first content is displayed may be reduced in response to the first input.

In operation 730, the electronic device may display the second area distinguished from the first area. The second area may be an area in which the second portion of the first content is displayed or the second content is displayed. In some cases, the second area may be represented as blank but is not limited thereto.

In the example embodiment, the electronic device may display information indicating the second area. Here, the information indicating the second area may be information indicating the second area distinguished from the first area and may include, for example, indirect information displayed on the display in response to the first area and the second area being displayed to be distinguished from each other. However, it is merely an example, and the information indicating the second area may include predetermined content (e.g., an image and an index line) that divides the first area and the second area.

In the example embodiment, when the first input is received, the electronic device may determine a predetermined area to be the first portion of the first content based on a position of the first input. In this case, the first area may be an area corresponding to a size of the first portion and corresponding to the predetermined position according to the first input.

In the example embodiment, the electronic device may receive the first input having a first direction or a second direction. When the first input is an input related to the first direction, the electronic device may determine a portion of the first content displayed in an area corresponding to a predetermined range of length from the bottom of the first side to be the first portion. The first area may include an area corresponding to the predetermined range of length from the top of the first side. When the first input is an input related to the second direction, the electronic device may determine a portion of the first content displayed in an area corresponding to the predetermined range of length from the top of the first side to be the first portion. The first area may include an area corresponding to the predetermined range of length from the bottom of the first side.

In the example embodiment, the electronic device may determine the first portion of the first content based on the position corresponding to the first input. For example, the electronic device may identify a first distance from the position corresponding to the first input to the bottom of the first side and a second distance from the position corresponding to the first input to the top of the first side. The electronic device may determine a portion of the first content corresponding to a greater one of the first distance and the second distance to be the first portion. In some cases, the electronic device may determine a portion of the first content corresponding to a smaller one of the first distance and the second distance to be the second portion. Here, the second portion may be displayed in the second area distinguished from the first area.

In the example embodiment, the electronic device may identify a distance between the position corresponding to the first input and a predetermined position and determine at least one of the position of the first area and the size of the first area based on the identified distance. For example, the electronic device may determine a horizontal or vertical length of the first area to correspond to the identified distance.

In the example embodiment, the electronic device may determine at least one of the size of the second area and the position of the second area based on the position corresponding to the first input. For example, when the position of the first input corresponds to the first position, the electronic device may determine the size of the second area to be the first size and determine the position of the second area to be positioned at the top of the first side. When the position of the first input corresponds to the second position, the electronic device may determine the size of the second area to be the second size and determine the position of the second area to be positioned at the top of the first side.

In the example embodiment, when the first input includes an input moving from the first position to the second position, the electronic device may determine at least one of the size of the second area and the size of the first area based on a difference between distances from the first position and the second position. Specifically, the electronic device may determine the size of the second area such that the difference in the distances from the first position and the second position corresponds to the vertical length (or horizontal length) of the second area. The size of the first area may correspond to a size of a remaining area of the entire area of the display of the first side other than the second area but is not limited thereto.

In the example embodiment, the electronic device may determine the size of the second area such that the display exposed to the first side corresponds to an expanded size.

In the example embodiment, operations 720 and 730 may be performed in parallel or irrespective of order.

Figure 8:
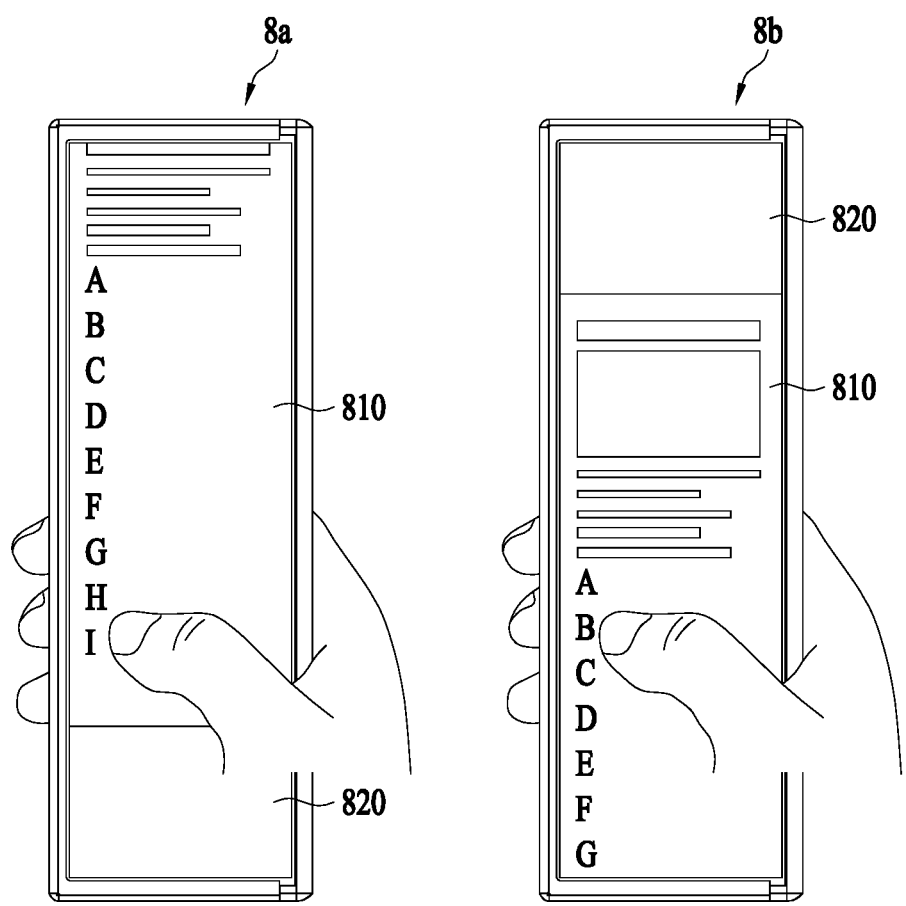
FIG. 8 is a diagram illustrating another example of displaying content on an electronic device according to an example embodiment of the present disclosure.

FIG. 8 is a diagram illustrating another example of displaying content on an electronic device according to an example embodiment of the present disclosure. Specifically, FIG. 8 illustrates an example of displaying second content in a second area 820.

Referring to FIG. 8, the electronic device may be divided into a first area 810 and the second area 820. The first area 810 may be larger than the second area 820 but it is merely an example.

Reference numeral 8*a* indicates a case in which the first area 810 is displayed in an upper part of a display. Reference numeral 8*b* indicates a case in which the first area 810 is displayed in a lower part of the display.

A first portion of first content may be displayed in the first area 810, and second content may be displayed in the second area 820. The second content indicated by the reference numerals 8*a* and 8*b* may include a predetermined image and may be represented as blank in some cases.

Positions (or layout) of the first area 810 and the second area 820 may be determined based on the first input applied in a state in which the first content is displayed on the display as indicated by the reference numeral 5*a* of FIG. 5. That is, according to the first input, content may be displayed on the display as indicated by the reference numeral 8*a* or 8*b*.

The first input may be input in a form varying in accordance with the user's needs. For example, when the first input of a first form is applied, content may be displayed as indicated by the reference numeral 8*a*. In addition, when the first input of a second form is applied, content may be displayed as indicated by the reference numeral 8*b*.

In this case, to use a lower portion of content more easily, the user may apply the first input of the first form so that the lower portion of content is moved upward and placed in the upper part of the display as indicated by the reference numeral 8*a*. In addition, to use an upper portion of content more easily, the user may apply the first input of the second form so that the upper portion of content is moved downward and placed in the lower part of the display as indicated by the reference numeral 8*b*.

Figure 9:
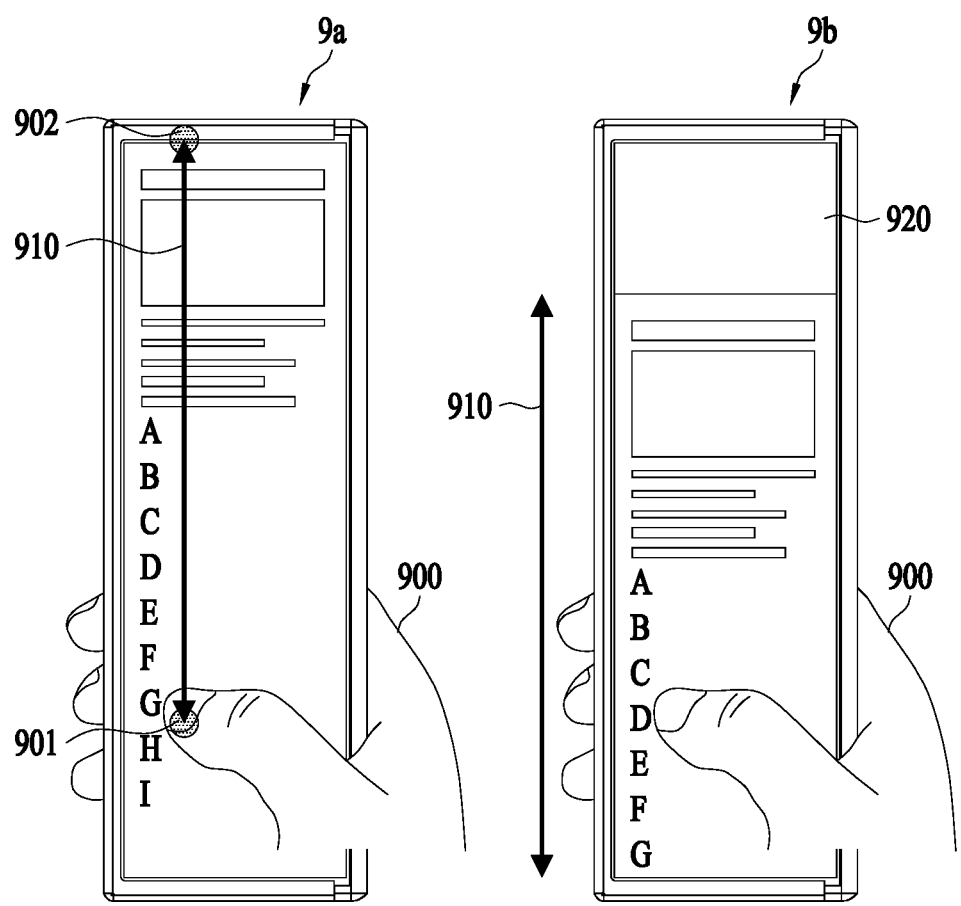
FIG. 9 is a diagram illustrating an example of a method of determining an area to display content on an electronic device according to an example embodiment of the present disclosure.

FIG. 9 is a diagram illustrating an example of a method of determining an area to display content on an electronic device according to an example embodiment of the present disclosure. Specifically, FIG. 9 is a diagram illustrating an example of a method of determining a first area or a first portion based on a position of a first input.

According to reference numeral 9*a*, a first input to a first position 901 may be applied by a user 900. The electronic device may identify a first distance 910 between the first position 901 and a predetermined position 902 in response to a first input. Here, the predetermined position 902 is shown as one position on a top bar as indicated by the reference numeral 9*a* but it is merely an example.

The electronic device may determine at least a portion of the first content corresponding to the first distance 910 to be the first portion displayed in the first area. Specifically, the first portion may be determined based on a line that is perpendicular to a longitudinal direction (or vertical direction) of the electronic device and passes the first position 901 as indicated by the reference numeral 9*a*, and then displayed as indicated by reference numeral 9*b*. Specifically, the first portion may include a greater one of two portions separated by the perpendicular line but is not limited thereto.

Depending on an example embodiment, the first portion may be determined to be at least a partial area including the first distance 910 in the first content.

In the example embodiment, the electronic device may identify the first distance 910 from the first position 901 to the top of the first side and a distance from the first position 901 to the bottom of the first side. The electronic device may determine a portion of the first content corresponding to a greater one of the identified distances to be the first portion. Accordingly, the portion of the first content corresponding to the greater distance may be displayed in the first area as indicated by the reference numeral 9b.

In the example embodiment, the first area may include a predetermined area. Specifically, the first area may be a predetermined area related to a position to which the first input is applied. For example, when the first input is applied to a predetermined area located in the lower part of the display, the first area may include the predetermined area located in the lower part of the display.

When the first input is applied to a position different from that of the reference numeral 9a, a size or position of the first area may be changed, and a related example will be described with reference to FIG. 10.

Referring to the reference numeral 9b, the first portion may be displayed in the first area and second content may be displayed in a second area 920. The second content may include, for example, content of another application differing from the first content or content (e.g., an image and an icon) of a form different from that of the content corresponding to the first portion.

Depending on an example embodiment, a remaining portion other than the first portion of the first content may be displayed in the second area 920. Since the related example has been described with reference to FIG. 5, redundant descriptions will be omitted.

Figure 10:
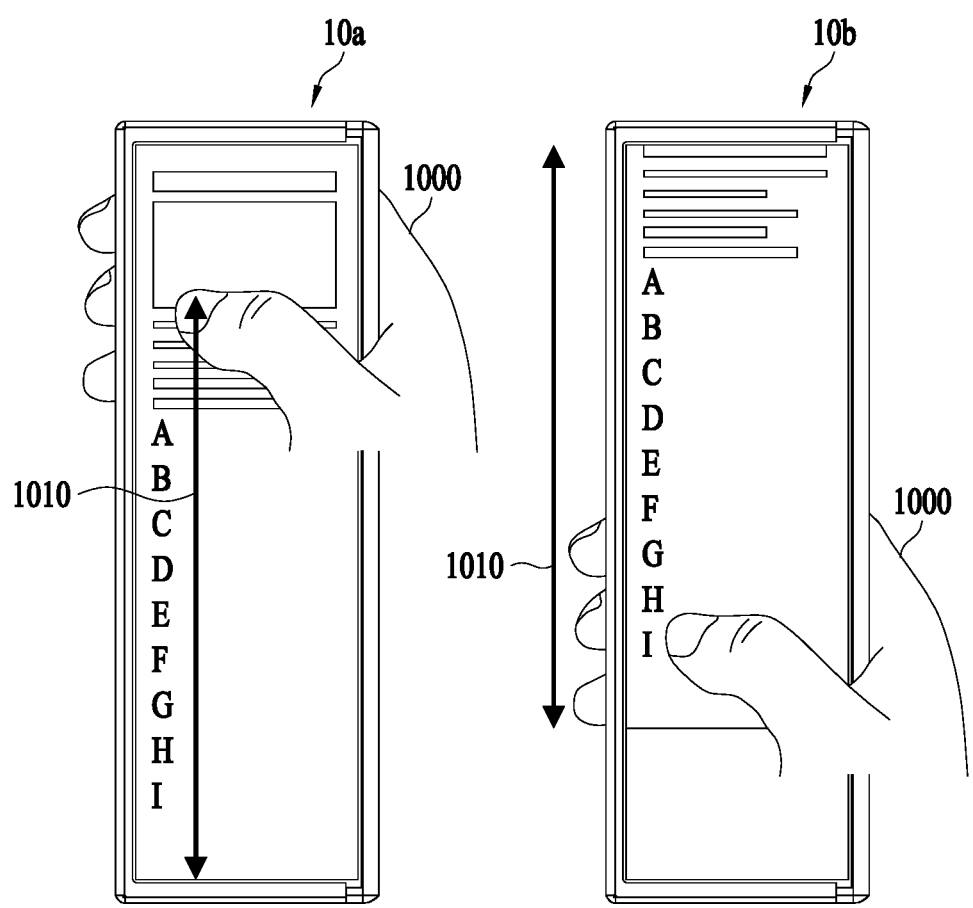
FIG. 10 is a diagram illustrating another example of a method of determining an area to display content on an electronic device according to an example embodiment of the present disclosure.

FIG. 10 is a diagram illustrating another example of a method of determining an area to display content on an electronic device according to an example embodiment of the present disclosure. In the following description of FIG. 10, redundant content regarding FIG. 9 will be omitted.

Specifically, FIG. 10 illustrates an example of applying a first input at a position different from that of FIG. 9. That is, the first input to a second position is applied by a user 1000.

In this case, the electronic device may identify a distance 1010 between the second position and a predetermined position. The electronic device may determine a portion of the first content corresponding to the identified distance to be the first portion. Based on the identification, the electronic device may display the first portion in the first area as indicated by the reference numeral 10b.

Here, the first area may include a predetermined area related to the second position to which the first input is applied. For example, as illustrated, the first area may include the second position and include a predetermined size of an area placed in an upper part of the display. Here, the predetermined size may be a size corresponding to the identified distance 1010.

Figure 11:
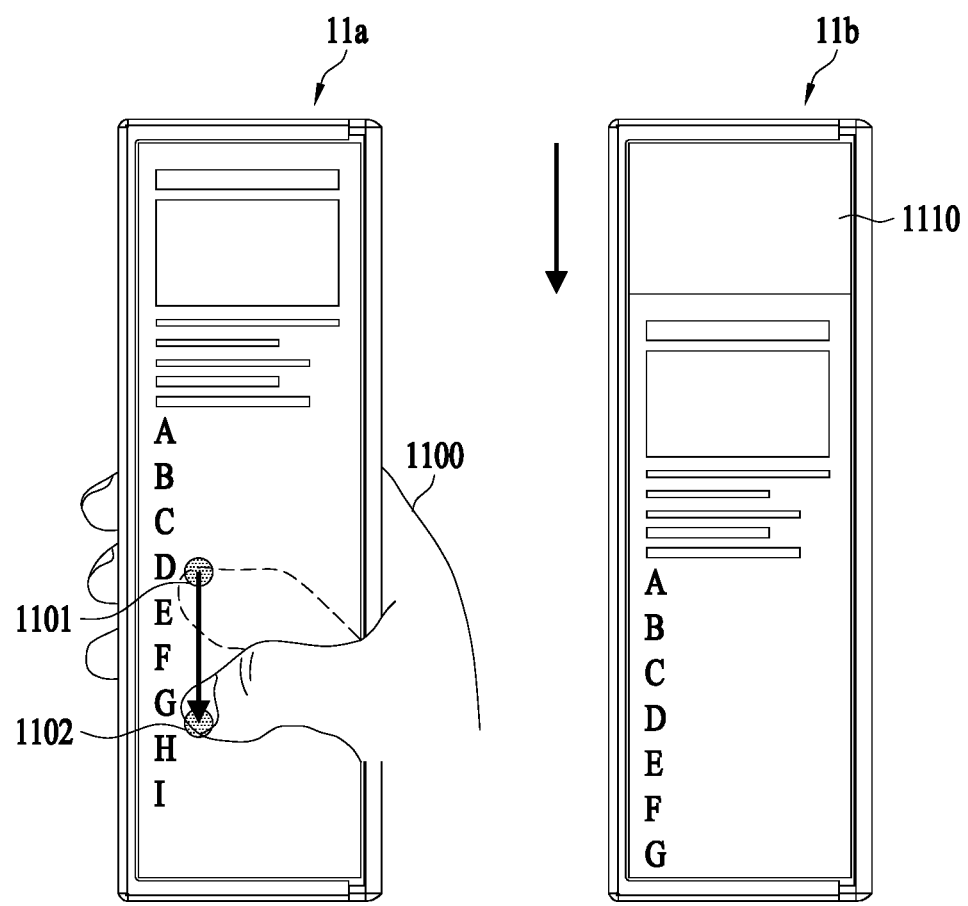
FIG. 11 is a diagram illustrating another example of a method of determining an area to display content on an electronic device according to an example embodiment of the present disclosure.

FIG. 11 is a diagram illustrating another example of a method of determining an area to display content on an electronic device according to an example embodiment of the present disclosure. Specifically, FIG. 11 is a diagram illustrating an example of a method for determining a first area when a first input includes an input moving in a predetermined direction.

According to reference numeral 11a, a first input moving from a first position 1101 to a second position 1102 may be applied by a user 1100. The electronic device may identify a distance between the first position 1101 and the second position 1102 in response to the first input.

The electronic device may determine a size of the first area or the second area based on the identified distance. Specifically, the electronic device may determine the size of the second area to correspond to the identified distance. For example, the electronic device may determine the size of the second area such that the second area has a length corresponding to the identified distance.

In the example embodiment, the electronic device may determine the size of the first area based on a remaining length excluding a length corresponding to the identified distance in the total length of the display placed at the first side. In other words, the electronic device may determine the size of the first area such that the first area has a length corresponding to the remaining length.

Meanwhile, when the first input includes the input moving in the predetermined direction, the electronic device may determine at least one of the first portion and a position of the first area based on the predetermined direction. For example, when the first input includes an input related to the first direction, the electronic device may determine a portion of the first content displayed within a predetermined range of length from the top of the first side to be the first portion. In addition, when the first input includes the input related to the first direction, the electronic device may determine the position of the first area such that the first area is placed adjacent to the bottom of the first side as indicated by the reference numeral 11b.

In the example embodiment, when the first input includes an input related to a second direction, the first portion or the position of the first area may be changed, and a related example is described in detail with reference to FIG. 12.

Figure 12:
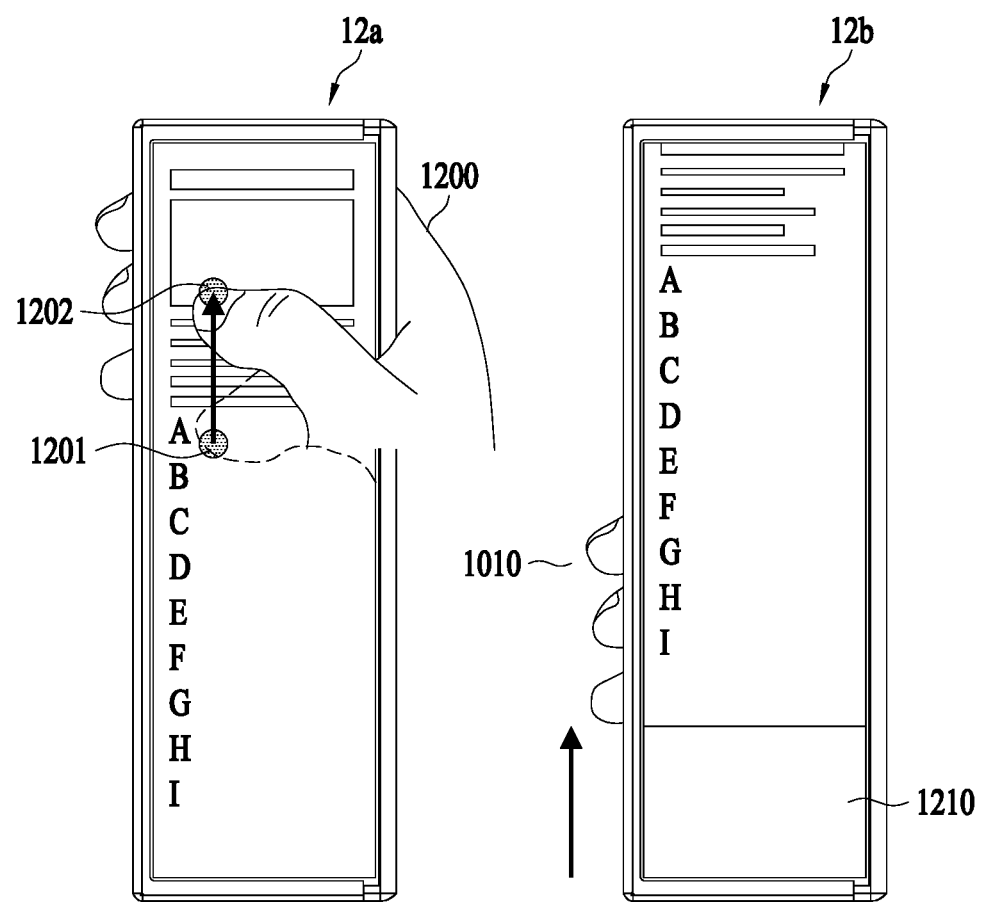
FIG. 12 is a diagram illustrating another example of a method of determining an area to display content on an electronic device according to an example embodiment of the present disclosure.

FIG. 12 is a diagram illustrating another example of a method of determining an area to display content on an electronic device according to an example embodiment of the present disclosure. In the following description, redundant content regarding FIG. 11 will be omitted.

According to reference numeral 12a, the electronic device may identify an input moved from a first position 1201 to a second position 1202 by a user 1200. A moving direction from the first position 1201 to the second position 1202 may differ from the direction described with reference to FIG. 11.

The electronic device may identify a distance between the first position 1201 and the second position 1202 and determine a size of a second area 1210 indicated by reference numeral 12b based on the identified distance.

Depending on an example embodiment, the electronic device may determine a size of a first area based on the identified distance. For example, the electronic device may determine the size of the first area such that a remaining length other than the identified distance in the length corresponding to the display of the first side is to be the length of the first area.

In the example embodiment, the electronic device may identify a direction of the input moving from the first position 1201 to the second position 1202. The electronic device may determine at least one of the position of the first area and the first portion displayed in the first area based on the identified direction.

For example, when the first input includes an input related to the second direction, the electronic device may determine a portion of the first content displayed within a predetermined range of distance from the bottom of the first side to be the first portion. In addition, when the first input includes the input related to the second direction, the electronic device may determine the position of the first area such that the first area is located adjacent to the top of the first side as indicated by the reference numeral 12*b*.

Meanwhile, FIGS. 11 and 12 illustrate the case in which the second content is displayed in the second area (e.g., a second area 1110 of FIG. 11, the second area 1210 of FIG. 12) but it is merely an example. In some cases, the second portion of the first content may be displayed in the second area.

Figure 13:
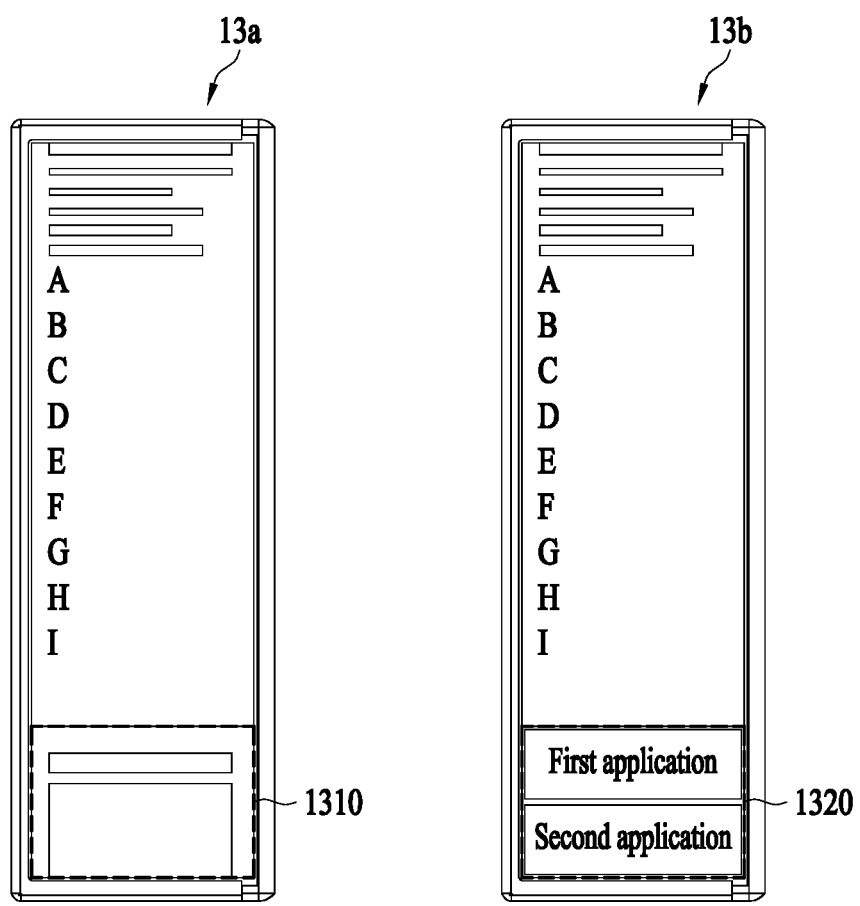
FIG. 13 is a diagram illustrating an example of content displayed in a second area on an electronic device according to an example embodiment of the present disclosure.

FIG. 13 is a diagram illustrating an example of content displayed in a second area of an electronic device according to an example embodiment of the present disclosure.

According to reference numeral 13*a*, a second portion of first content may be displayed in a second area 1310. The second portion may include, for example, content different from a first portion of the first content.

As indicated by the reference numeral 13*a*, in a state in which the first portion is displayed in the first area and the second portion is displayed in the second area, a scroll input that moves content may be applied to use the content. For example, when the scroll input is applied to the first area, content displayed in the first area may move within the first area. In this example, another portion of the first content, which is not displayed currently, may be displayed in the first area.

Meanwhile, in some cases, when the scroll input is applied to the first area, content displayed in the second area may also move. For example, as illustrated, when the first portion displayed in the second area is a portion of the first content, which has been placed in an upper part of the first portion displayed in the first area, a partial area corresponding to the first portion may be displayed in the second area based on a downward scroll input. In this example, displaying an upper area of the first portion displayed in the first area may be suspended in response to the content of the second area being scrolled. In other words, the upper area of the first portion may disappear and a new portion of the first content may be displayed below the first portion.

However, it is merely an example, and in some cases, a scroll of each of the first area and the second area may operate independently. For example, when the scroll input is applied to the first area, a scroll operation may be performed on the first portion. In addition, when the scroll input is applied to the second area, a scroll operation may be performed on the second portion.

According to reference numeral 13*b*, content related to another application (e.g., a first application and a second application) may be displayed in a second area 1320. Another application may include, for example, an application that provides different content distinguished from the first content. The content displayed in the second area 1320 may include content representing each of a plurality of applications but is not limited thereto. The content displayed in the second area 1320 may include content representing a single application.

As an example, application-related content may include an icon representing an application. As another example, application-related content may include content related to an operation or function of an application.

As an example, the first application and the second application related to the second area may be predetermined applications. As another example, the first application may include an application that is most recently executed, and the second application may include an application that is most recently executed after the first application has been executed.

Figure 14:
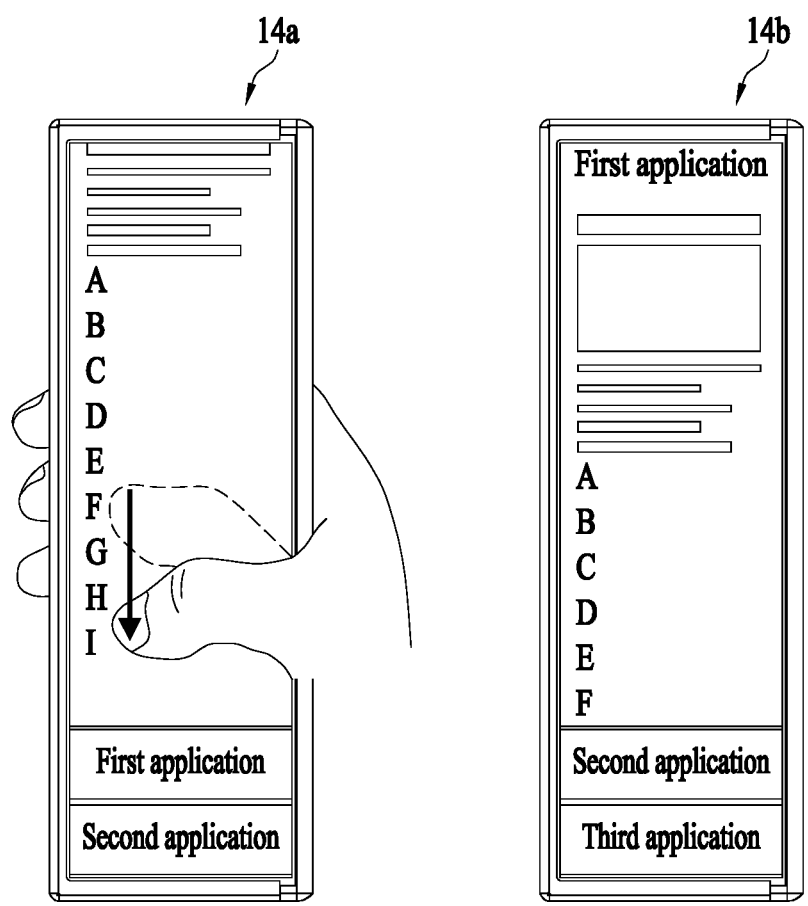
FIGS. 14 and 15 are diagrams illustrating examples of changing content in an electronic device according to an example embodiment of the present disclosure.
Figure 15:
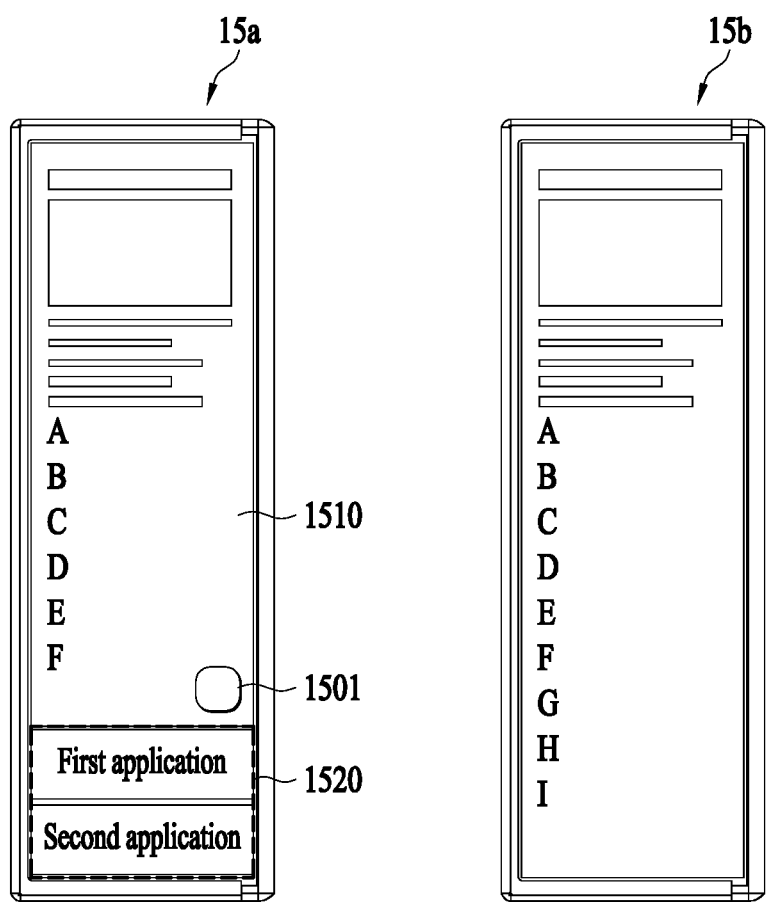

FIGS. 14 and 15 are diagrams illustrating examples of changing content in an electronic device according to an example embodiment of the present disclosure.

FIG. 14 illustrates an example of changing content displayed in a first area to content on an application related to a second area when application-related content is included in the second area.

Specifically, according to reference numeral 14*a*, contents related to a first application and a second application may be displayed in the second area. The electronic device may identify a second input related to an application. The second input may be a predetermined input and include a specific input on the first area, for example, a touch input of a predetermined area or less.

The electronic device may change content of the first area in response to the second input as indicated by reference numeral 14*b*. Specifically, when the second input is received, the electronic device may display content related to a first application in the first area instead of a first portion of first content. Here, the first application may be an application that a priority is given in relation to the second input, and the priority may be determined based on a recent execution history. For example, the priority may be given in an order of recent execution.

Meanwhile, in response to the content of the first area being changed, the content displayed in the second area may be changed. For example, the content related to the first application in the content displayed in the second area may disappear and content related to a third application may be newly displayed. Here, the third application may include a predetermined application or an application that is most recently executed after a second application has been executed.

FIG. 15 is a diagram illustrating an example of changing a layout of a display divided into a first area and a second area.

Specifically, according to reference numeral 15*a*, first content may be displayed in a first area 1510 and contents related to a first application and a second application may be displayed in a second area 1520.

In some cases, the first area 1510 may further include a button icon 1501. In such cases, when an input is applied to the button icon 1501, the electronic device may suspend displaying the second area 1520 and expand the first content that has been displayed in the first area 1510 to be displayed as indicated by reference numeral 15*b*. In other words, when the first portion of the first content is displayed in the first area, the first content may be fully displayed as indicated by the reference numeral 15*b*.

The present embodiment may also be applicable to a case in which a second portion of the first content is displayed in the second area 1520.

Figure 16:
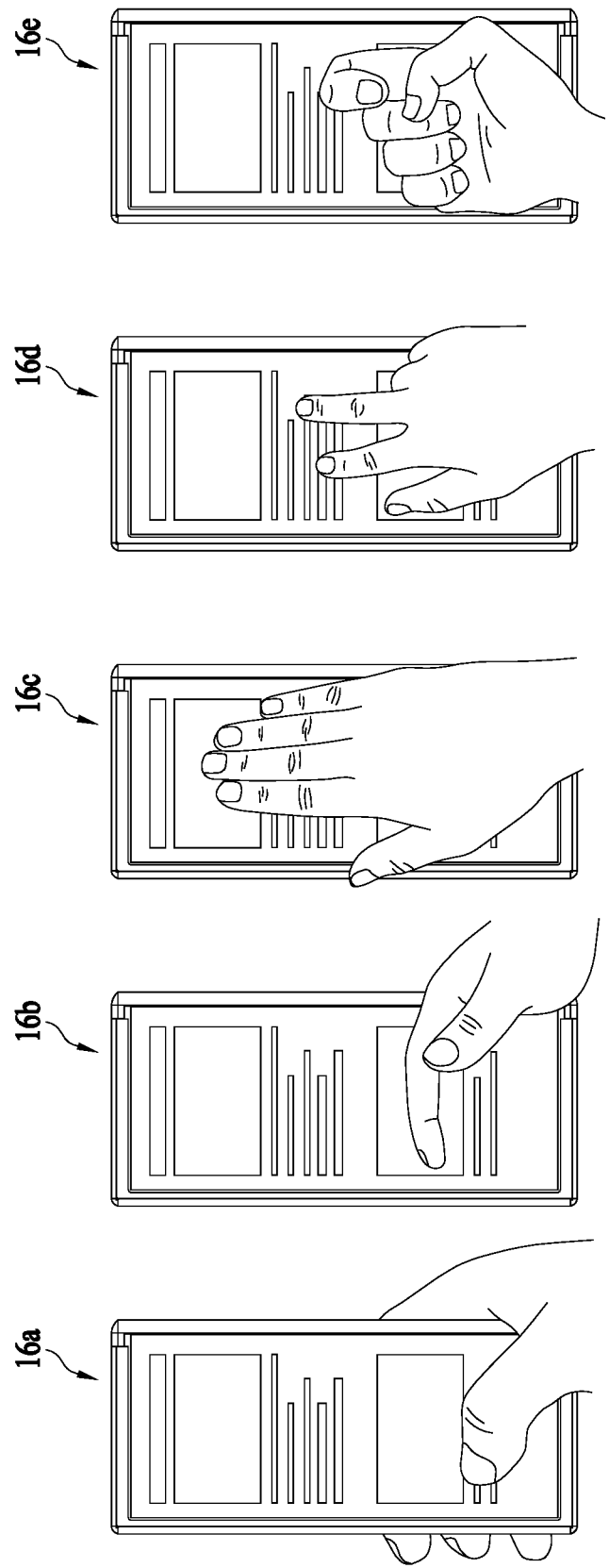
FIGS. 16 and 17 are diagrams illustrating types of inputs applied to an electronic device according to an example embodiment of the present disclosure.
Figure 17:
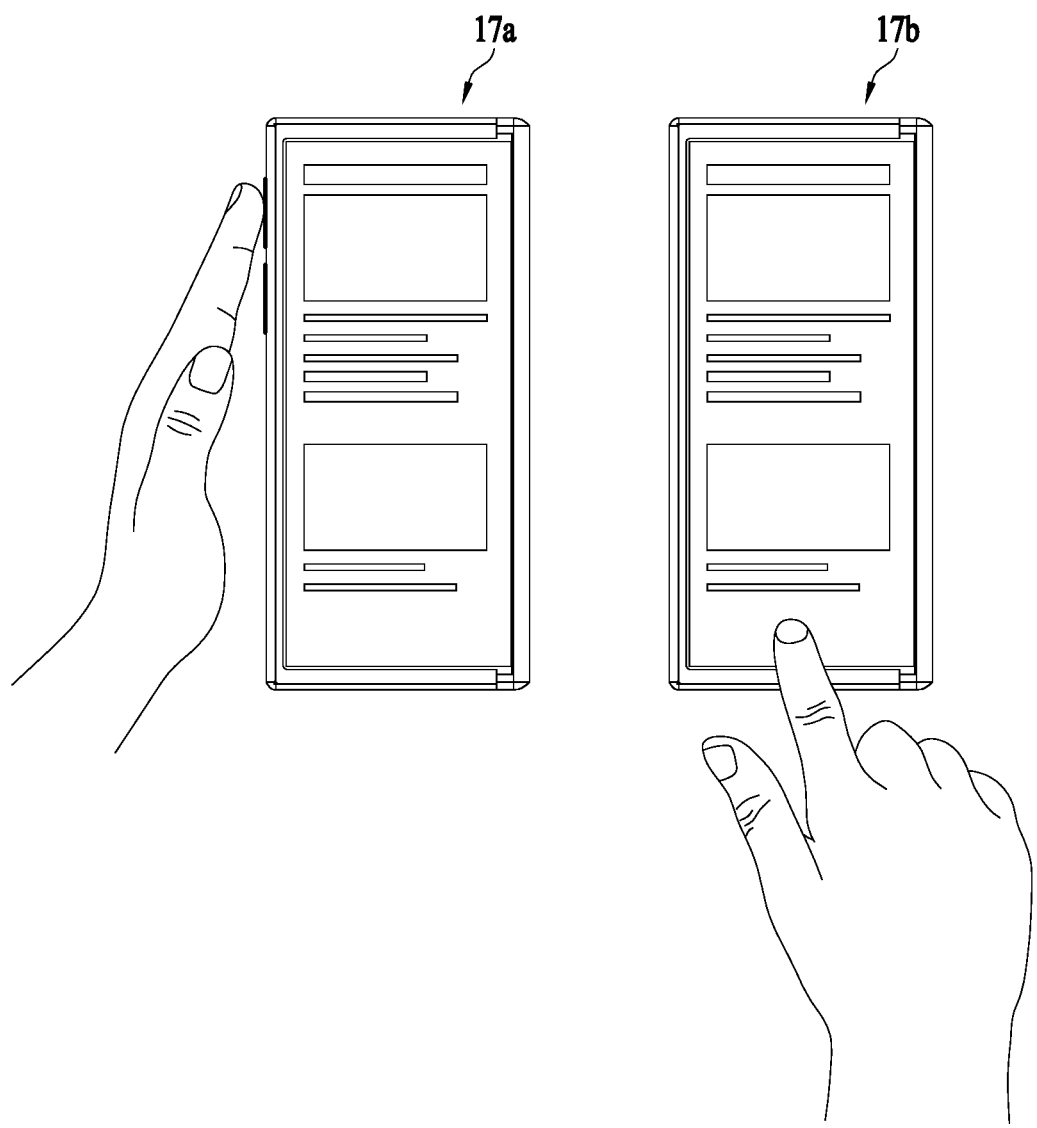

FIGS. 16 and 17 are diagrams illustrating types of inputs applied to an electronic device according to an example embodiment of the present disclosure.

FIG. 16 illustrates an example of a user input to a display. Reference numeral 16*a* indicates an input of touching a predetermined point on the display with a fingertip. The input of touching with the fingertip may have a size of a predetermined area or less or a size greater than the predetermined area based on a change in an angle of a finger. In this case, the electronic device may identify inputs to be different based on areas of the inputs. For example, the electronic device may identify the input having the size of the predetermined area or less to be a general touch input and identify the input having the size greater than the predetermined area to be an input for separating the first area and the second area.

In some cases, an input of reference numeral 16*b* may include an input that moves in a predetermined direction. For example, the predetermined direction may include a first direction in which an input moves upwardly or a second direction in which an input moves downwardly. However, it is merely an example, and the first direction or the second direction may be implemented as a clockwise direction or a counterclockwise direction.

The reference numeral 16*b* may include an input of touching a display with one surface of a finger. One surface of the finger may have a larger area than an area related to a fingertip. In some cases, the input of the reference numeral 16*b* may include an input that moves in a predetermined direction. For example, the predetermined direction may include the clockwise direction or the counterclockwise direction.

Reference numeral 16*c* may include a touch input applied using a palm. Specifically, an input of the reference numeral 16*c* may include an input applied by touching a display with the palm, and in some cases, include an input of moving (or sliding) the palm in the predetermined direction.

Reference numeral 16*d* may include a touch input applied using a plurality of fingers. As illustrated, a touch input may be applied by fingertips of a thumb, an index finger, and a middle finger being in contact with the display.

Reference numeral 16*e* may include an input applied using a knuckle of a finger. Specifically, the reference numeral 16*e* may include an input applied based on a motion corresponding to a user knocking on a door, for example, a motion of tapping the display using the knuckle of the finger.

Reference numeral 17*a* of FIG. 17 indicates an input on a sensor (e.g., the sensor 630 of FIG. 6) included in an electronic device. The reference numeral 17*a* indicates a case in which the sensor is implemented as a physical key, but it is merely an example.

Although the sensor is disposed at a side surface of the electronic device to apply an input in the case of the reference numeral 17*a*, it is merely an example. In some cases, the sensor may also be disposed at a first side or a second side of the electronic device.

Reference numeral 17*b* indicates an example of an input to a predetermined key. The predetermined key may be a key designated by the electronic device and include, for example, a home button. The home button may be implemented in a form of hardware or software. However, example embodiments are not limited to such implementation.

Meanwhile, the input (e.g., the first input, the second input) mentioned herein may include at least one of the inputs described with reference to FIG. 16 or 17. However, it is merely an example, and various types of inputs may be used in the present disclosure.

An electronic device and a control method according to example embodiments of the present disclosure may change an area for displaying content based on an input so that the content is more conveniently and efficiently used to satisfy the user's needs.

The above description is merely illustrative of the technical idea of the present disclosure, and those skilled in the art to which the present disclosure pertains may make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

The invention claimed is:

1. An electronic device comprising:
a flexible display configured to extend at a first side of the electronic device to increase a display area of the flexible display, the flexible display being a touch screen; and
a controller configured to:
display first content,
in response to a first touch input moving from a first position and a second position on the touch screen, identify a distance between the first position and the second position, determine a size of a first area and a size of a second area based on the distance and display a first portion of the first content in the first area corresponding to the first side of the electronic device based on the size of the first area and display the second area distinguished from the first area based on the size of the second area;
display a second portion of the first content in the second area; and
move contents displayed in the first area and the second area to correspond to each other based on a second input received in one of the first area and the second area.

2. The electronic device of claim 1, wherein the first input comprises an input related to a first direction or a second direction,
when the first input is related to the first direction, content corresponding to the first area is displayed on an area corresponding to a predetermined range of length from a bottom of the first side, and
when the first input is related to the second direction, content corresponding to the first area is displayed on an area corresponding to a predetermined range of length from a top of the first side.

3. The electronic device of claim 1, wherein the controller is configured to:
identify a distance between a position corresponding to the first input and a predetermined position; and
determine at least one of a position of the first area and a size of the first area based on the identified distance.

4. The electronic device of claim 1, wherein the controller is configured to determine at least one of a position of the second area and a size of the second area based on a position corresponding to the first input.

5. The electronic device of claim 1, wherein the first portion of the first content is determined based on a first distance from a position corresponding to the first input to a bottom of the first side and a second distance from the position corresponding to the first input to a top of the first side.

6. The electronic device of claim 1, wherein the first input comprises an input moving from a first position to a second position on the flexible display, and
the controller is configured to:
identify a distance between the first position and the second position; and
determine at least one of a size of the first area and a size of the second area based on the identified distance.

7. The electronic device of claim 1, wherein a size of the second area is changed based on a change in size of the first area.

8. The electronic device of claim 1, wherein a size of an area in which the first content is displayed decreases in response to the first input.

9. The electronic device of claim 1, wherein the controller is configured to display second content in the second area.

10. The electronic device of claim 9, wherein the first content and the second content are controlled independently of each other based on a position of an input received.

11. The electronic device of claim 9, wherein the second content comprises content related to a predetermined application, and
the controller is configured to display the content related to the predetermined application in the first area in response to a third input.

12. The electronic device of claim 1, wherein the controller is configured to display content in the second area, and
the content displayed in the second area comprises content selected from second content and a second portion of the first content based on a position of the first input and a type of the first input.

13. The electronic device of claim 1, wherein the first input comprises at least one of a touch input on an area of at least a threshold size, a touch input on at least one position, a double tab input, an input on a sensor, and an input on a predetermined position.

14. A method of controlling an electronic device, the method comprising:
displaying first content on a flexible display of the electronic device, the flexible display being configured to extend at a first side of the electronic device to increase a display area of the flexible display, the flexible display being a touch screen;
in response to a first touch input moving from a first position and a second position on the touch screen, identifying a distance between the first position and the second position, determining a size of a first area and a size of a second area based on the distance and displaying a first portion of the first content in the first area corresponding to the first side of the electronic device based on the size of the first area and displaying the second area distinguished from the first area based on the size of the second area;
displaying a second portion of the first content in the second area; and
moving contents displayed in the first area and the second area to correspond to each other based on a second input received in one of the first area and the second area.

15. The method of claim 14, wherein the first input comprises an input related to a first direction or a second direction,
when the first input is related to the first direction, content corresponding to the first area is displayed on an area corresponding to a predetermined range of length from a bottom of the first side, and
when the first input is related to the second direction, content corresponding to the first area is displayed on an area corresponding to a predetermined range of length from a top of the first side.

16. The method of claim 14, further comprising:
identifying a distance between a position corresponding to the first input and a predetermined position; and
determining at least one of a position of the first area and a size of the first area based on the identified distance.

17. The method of claim 14, further comprising:
determining at least one of a position of the second area and a size of the second area based on a position corresponding to the first input.

18. The method of claim 14, wherein the first portion of the first content is determined based on a first distance from a position corresponding to the first input to a bottom of the first side and a second distance from the position corresponding to the first input to a top of the first side.

* * * * *